(12) United States Patent
Hoffmann

(10) Patent No.: US 12,527,249 B2
(45) Date of Patent: Jan. 20, 2026

(54) HYDRAULIC CIRCUIT FOR COLTER PRESSURE ADJUSTMENT AT AN AGRICULTURAL SPREADING MACHINE

(71) Applicant: Amazonen-Werke H. Dreyer SE & Co. KG, Hasbergen (DE)

(72) Inventor: Karl-Peter Hoffmann, Hude (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 0 days.

(21) Appl. No.: 18/568,671

(22) PCT Filed: May 31, 2022

(86) PCT No.: PCT/EP2022/064665
§ 371 (c)(1),
(2) Date: Dec. 8, 2023

(87) PCT Pub. No.: WO2022/258422
PCT Pub. Date: Dec. 15, 2022

(65) Prior Publication Data
US 2024/0206374 A1    Jun. 27, 2024

(30) Foreign Application Priority Data

Jun. 10, 2021   (DE) ..................... 10 2021 114 944.4

(51) Int. Cl.
*A01C 7/20*      (2006.01)
*F16K 17/04*     (2006.01)

(52) U.S. Cl.
CPC .......... *A01C 7/205* (2013.01); *F16K 17/0433* (2013.01)

(58) Field of Classification Search
CPC ............... Y10T 137/7722; F16K 17/04; F16K 17/0433; A01C 7/205; A01C 5/00; A01C 5/06; F15B 2211/57; F15B 2211/528
See application file for complete search history.

(56) References Cited

U.S. PATENT DOCUMENTS

| | | | | |
|---|---|---|---|---|
| 5,065,681 | A | * | 11/1991 | Hadley ................ A01B 63/114 111/55 |
| 2008/0163947 | A1 | * | 7/2008 | Matsuzaki .............. F16K 17/04 137/868 |

(Continued)

FOREIGN PATENT DOCUMENTS

| | | | | |
|---|---|---|---|---|
| DE | 2360530 | A1 | * | 6/1975 |
| DE | 10313175 | A1 | * | 10/2004 ............. A01B 63/10 |

(Continued)

OTHER PUBLICATIONS

International Search Report for International Application No. PCT/EP2022/064665 dated Sep. 23, 2022 (includes English language translation).

(Continued)

*Primary Examiner* — Jessica Cahill
(74) *Attorney, Agent, or Firm* — Potomac Law Group, PLLC; John J. Penny, Jr.

(57) ABSTRACT

The invention relates to a hydraulic circuit for colter pressure adjustment at an agricultural spreading machine, with a first line region which is configured to be connected to a first colter pressure adjustment cylinder and to specify a hydraulic pressure to the first colter pressure adjustment cylinder, a first pressure limitation valve which is configured to limit the hydraulic pressure in the first line region to a first maximum pressure, a second line region which is configured to be connected to a second colter pressure adjustment cylinder and to specify a hydraulic pressure to the second colter pressure adjustment cylinder, and a second pressure limitation valve which is configured to limit the hydraulic pressure in the second line region to a second maximum pressure.

10 Claims, 1 Drawing Sheet

(56) References Cited

U.S. PATENT DOCUMENTS

| 2012/0048159 | A1* | 3/2012 | Adams | ................... | A01C 7/203 |
| | | | | | 111/163 |
| 2014/0214284 | A1* | 7/2014 | Sauder | ..................... | A01C 5/06 |
| | | | | | 701/50 |
| 2019/0072114 | A1* | 3/2019 | Myers | ..................... | F15B 15/06 |

FOREIGN PATENT DOCUMENTS

| EP | 2982230 | A1 | 2/2016 |
| EP | 3106012 | B1 | 12/2019 |
| WO | 2019046851 | A1 | 3/2019 |

OTHER PUBLICATIONS

German Search Report for German Application No. 10 2021 114 944.4 dated Mar. 22, 2022 (includes English language translation).

\* cited by examiner

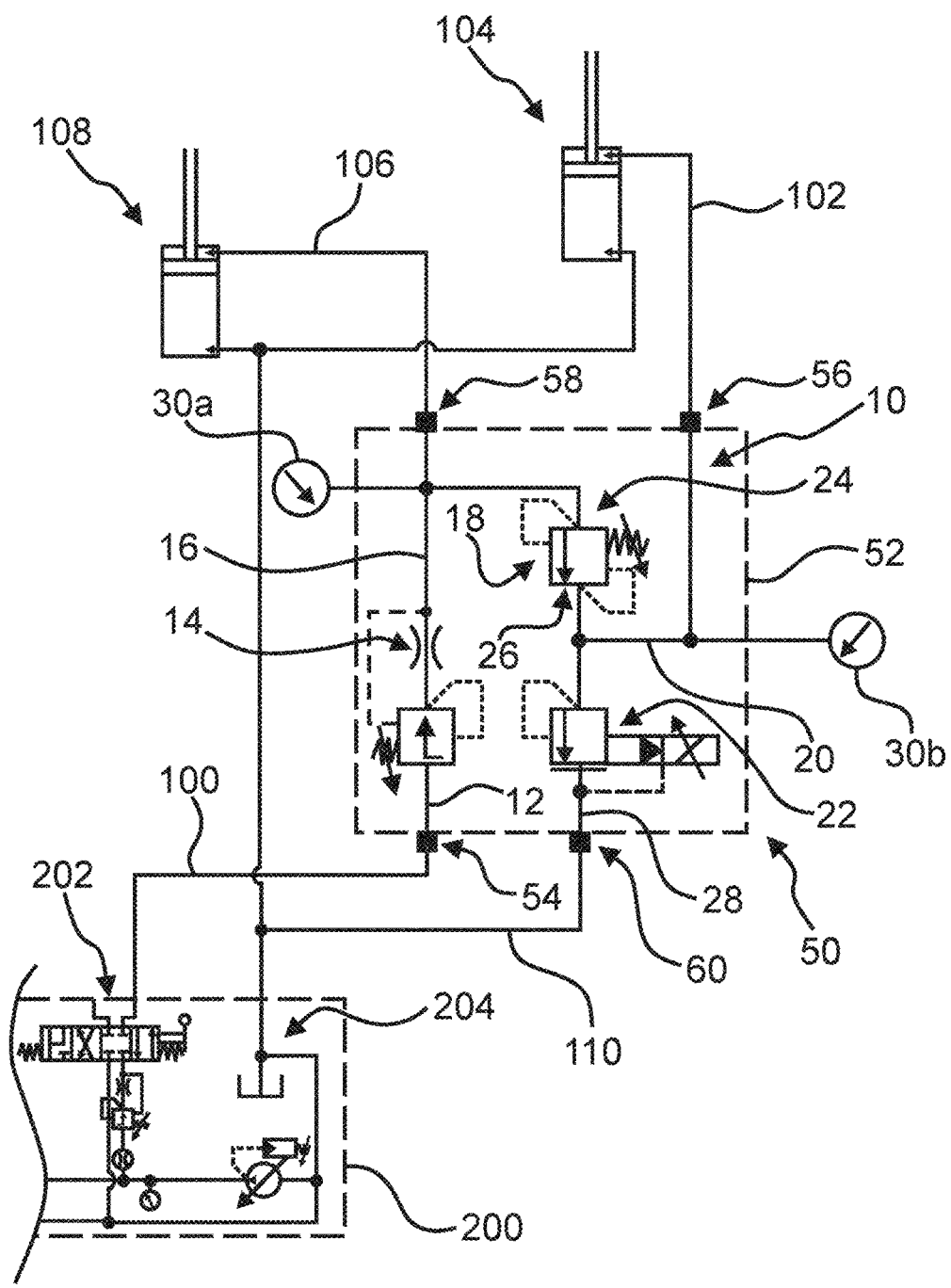

HYDRAULIC CIRCUIT FOR COLTER PRESSURE ADJUSTMENT AT AN AGRICULTURAL SPREADING MACHINE

CROSS REFERENCE TO RELATED APPLICATIONS

The present application claims priority under 35 U.S.C. § 365 to PCT/EP2022/064665 filed on May 31, 2022 and under 35 U.S.C. § 119 (a) to German Application No. 10 2021 114 944.4 filed on Jun. 10, 2021.

BACKGROUND

The disclosure relates to a hydraulic circuit for colter pressure adjustment at an agricultural spreading machine, a hydraulic control block, an agricultural spreading machine, and a method for adjusting the colter pressure at an agricultural spreading machine.

Since the colters of an agricultural spreading machine penetrate less deeply into the ground at the same colter pressure in the travel lane of a tractor than colters running outside the travel lane due to soil compaction, the colters running in the travel lane must be acted upon with increased colter pressure so that the spreading result is not impaired be soil compaction in the region of the travel lane. In particular, different depositing depths within and outside the travel lane should be prevented. In agricultural spreading machines, each colter or group of colters is typically associated with a colter pressure adjustment cylinder with which the colter pressure at the colter or group of colters can be changed or adjusted.

Two separate and independently controllable hydraulic circuits have previously been required to simultaneously implement different colter pressures at the colter pressure adjustment cylinders of an agricultural spreading machine. This means that twice the volume flow is required in order to be able to generate two different colter pressures simultaneously.

In this context, for example, a solution is known from publication U.S. Pat. No. 5,065,681 A of acting upon a group of colters in a sowing machine with the same pressure. It is proposed in publication EP 3 106 012 B1 to provide two controllable pressure valves in a hydraulic circuit.

SUMMARY

The object underlying the disclosure is to reduce the complexity required for the provision of different colter pressures at the colters of an agricultural spreading machine.

The object is satisfied by a hydraulic circuit of the type mentioned at the outset, where the second maximum pressure to which the second pressure limitation valve limits the hydraulic pressure in the second line region is dependent upon the hydraulic pressure in the first line region.

Two different hydraulic pressures can be provided with the hydraulic circuit with comparatively low complexity and can be used to implement two colter pressures differing from one another. In this way, a higher colter pressure can be set at the colter or colters that run in the compacted tractor lane than at the colters that run outside the tractor lane. The dependence of the second maximum pressure upon the hydraulic pressure in the first line region ensures with low complexity that the colters in the travel lane always experience an increased pressure so that the soil compaction in the region of the travel lane is compensated for by the difference in colter pressure. The hydraulic circuit achieves this by a simple design and a small number of inexpensive standard components.

For example, seeds and/or fertilizer can be spread with the agricultural spreading machine. The agricultural spreading machine can therefore be, for example, a sowing machine or a fertilizer spreading machine. Furthermore, the agricultural spreading machine can be configured for the combined spreading of seeds and fertilizer. The colters can therefore be sowing colters or fertilizer colters.

In a preferred embodiment of the hydraulic circuit according to the disclosure, the second line region abuts against the valve inlet of the second pressure limitation valve. Furthermore, the first line region abuts against the valve outlet of the second pressure limitation valve. The second line region and the first line region of the hydraulic circuit are therefore separated from one another by the second pressure limitation valve.

In a further preferred embodiment of the hydraulic circuit according to the disclosure, the second pressure limitation valve is configured to open when an opening pressure that prevails at the valve inlet is exceeded, where the opening pressure is preferably dependent upon a spring closing force which is exerted by a spring of the second pressure limitation valve. The opening pressure is preferably additionally dependent upon an additional closing force which is exerted by the hydraulic pressure in the first line region. Due to the opening pressure being dependent upon the spring closing force and the additional closing force, the second maximum pressure to which the second pressure limitation valve limits the hydraulic pressure in the second line region is, firstly, dependent upon the spring properties of the valve spring of the second pressure limitation valve and, secondly, upon the hydraulic pressure in the first line region. The difference between the second maximum pressure to which the second pressure limitation valve limits the hydraulic pressure in the second line region and the hydraulic pressure in the first line region can be determined by way of the spring properties of the valve spring of the second pressure limitation valve.

Furthermore, a hydraulic circuit according to the disclosure is advantageous in which the second pressure limitation valve is configured such that the spring closing force and the additional closing force add up to a total closing force and thus lead to an increased opening pressure. The second pressure limitation valve therefore operates according to the principle of closing force addition, where a spring closing force predetermined by the spring properties of the valve spring and an additional closing force predetermined by the hydraulic pressure in the first line region are taken into account for the closing force addition. The hydraulic pressure in the second line region is increased as compared to the hydraulic pressure in the first line region by a pressure difference that is due to the spring closing force. The hydraulic pressure in the second line region is increased by a fixed amount. This amount can be set at the factory and/or be adjustable by the machine operator.

A hydraulic circuit according to the disclosure is furthermore advantageous in which the first pressure limitation valve and the second pressure limitation valve are connected in series. The first line region is preferably limited by the first pressure limitation valve, the second pressure limitation valve, and the at least one first colter pressure cylinder. The implemented differential pressure circuit is therefore implemented by two pressure limitation valves connected in series.

In a further preferred embodiment of the hydraulic circuit according to the disclosure, the second pressure limitation valve can be adjusted mechanically and/or manually. The fluid pressure required to overcome the spring closing force is preferably adjustable. The spring properties of the valve spring and therefore the spring closing force influencing the opening pressure can be adjusted by mechanical and/or manual adjustment. As part of the mechanical and/or manual adjustment of the second pressure limitation valve, for example, the preload of the valve spring can be changed. To increase the spring closing force and therefore to increase the required opening pressure, the preload of the spring can be increased mechanically and/or manually. To reduce the spring closing force and therefore to reduce the required opening pressure, the preload of the valve spring can be reduced.

In a further development, the hydraulic circuit according to the disclosure comprises connected to the second pressure limitation valve an operating device by way of which the second pressure limitation valve can be adjusted. For example, the preload of the valve spring of the second pressure limitation valve can be adjusted by way of the operating device. The operating device can be, for example, a hand wheel or an adjustment slide. The operating device can comprise a scale which can be read by a machine operator and which shows the differential pressures to be realized by the second pressure limitation valve between the second maximum pressure to which the second pressure limitation valve limits the hydraulic pressure in the second line region and the hydraulic pressure in the first line region.

In a further preferred embodiment of the hydraulic circuit according to the disclosure, the first pressure limitation valve can be adjusted electrically. If the first pressure limitation valve is adjustable electrically, it can be connected to a control device for the colter pressure adjustment. The colter pressure generated by the first colter pressure cylinder can be adjusted by the control device. This also has an influence on the colter pressure generated by the second colter pressure adjustment cylinder. The first pressure limitation valve can be, for example, a proportional pressure limitation valve in which opening pressures can be adjusted in proportion to the solenoid current.

The object underlying the disclosure is furthermore satisfied by a hydraulic control block of the type mentioned at the outset, where the hydraulic circuit of the hydraulic control block according to the disclosure is configured according to one of the embodiments described above. With regard to the advantages and modifications of the hydraulic control block according to the disclosure, reference is therefore first made to the advantages and modifications of the hydraulic circuit according to the disclosure.

The housing of the hydraulic control block, into which the hydraulic circuit is integrated, can be configured to be made of, for example, plastic material or metal. For example, the housing is a plastic injection molded housing or an aluminum injection molded housing.

The hydraulic control block according to the disclosure preferably comprises a first cylinder connection and a second cylinder connection. A first colter pressure adjustment cylinder can be connected via the first cylinder connection to the first line region. A second colter pressure adjustment cylinder can be connected via the second cylinder connection to the second line region. In addition, the hydraulic control block preferably comprises an inlet connection and a return connection. Hydraulic fluid from a hydraulic source on the side of the tractor can be introduced into the hydraulic circuit through the inlet connection. Hydraulic fluid from the hydraulic circuit can be supplied through the return connection to a hydraulic tank on the side of the tractor.

The object underlying the disclosure is furthermore satisfied by an agricultural spreading machine of the type mentioned at the outset, where the hydraulic circuit of the spreading machine according to the disclosure is configured according to one of the embodiments described above or is part of a previously described hydraulic control block. With regard to the advantages and modifications of the spreading machine according to the disclosure, reference is first made to the advantages and modifications of the hydraulic circuit and the hydraulic control block according to the disclosure.

The spreading machine can be, for example, an attachment that can be attached to an agricultural vehicle, in particular to a tractor. The agricultural spreading machine can be configured to be carried or towed by the agricultural vehicle. The agricultural spreading machine can be, for example, a sowing machine.

The object underlying the disclosure is furthermore satisfied by a method of the type mentioned at the outset, where the second maximum pressure to which the second pressure limitation valve limits the hydraulic pressure in the second line region is dependent upon the hydraulic pressure in the first line region. The method according to the disclosure is preferably used to adjust the colter pressure at an agricultural spreading machine according to one of the embodiments described above. The adjustment of the colter pressure is preferably implemented by way of a hydraulic circuit according to one of the embodiments described above.

With regard to the advantages and modifications of the method according to the disclosure, reference is therefore made to the advantages and modifications of the agricultural spreading machine according to the disclosure and the advantages and modifications of the hydraulic circuit according to the disclosure.

BRIEF DESCRIPTION OF THE DRAWINGS

A preferred embodiment of the disclosure shall be explained and described in more detail below with reference to the accompanying drawing, where:

FIG. 1 shows an embodiment of the hydraulic circuit according to the disclosure for colter pressure adjustment in a schematic illustration.

DETAILED DESCRIPTION

FIG. 1 shows a hydraulic control block 50 of an agricultural spreading machine configured as a sowing machine. The hydraulic control block 50 comprises a hydraulic circuit 10 which is integrated into a housing 52 and which is used to adjust the colter pressure at the agricultural spreading machine.

Hydraulic control block 50 comprises an inlet connection 54 which is connected via an inlet line 100 to a hydraulic source 202 of a hydraulic unit 200 on the side of the tractor. Hydraulic fluid, for example, hydraulic oil from a hydraulic source 202 on the side of the tractor can be introduced via inlet connection 54 into hydraulic circuit 10. Hydraulic control block 50 furthermore comprises a first cylinder connection 56 and a second cylinder connection 58. First cylinder connection 56 is connected via a connecting line 102 to a first colter pressure adjustment cylinder 104. Second cylinder connection 58 is connected via a connecting line 106 to a second colter pressure adjustment cylinder 108. A hydraulic pressure differing from one another is provided via connecting lines 102, 106 to colter pressure adjustment cylinders 104, 108 so that colter pressure adjustment cylinders 104,108 generate different colter pressures at respective sowing colters.

Since the sowing colter connected to colter pressure adjustment cylinder 108 runs in the travel lane of the tractor, a higher colter pressure is required at this sowing colter due to the soil compaction caused by the tractor so that a uniform depositing depth is implemented across the entire width of the machine. The sowing colter connected to colter pressure adjustment cylinder 104 therefore runs outside the travel lane of the tractor and requires a lower colter pressure due to less soil compaction.

Hydraulic control block 50 furthermore comprises a return connection 60. Hydraulic fluid from hydraulic circuit 10 can be discharged via return connection 60 and return line 110 and fed to a hydraulic tank 204 of hydraulic unit 200 on the side of the tractor. Return line 110 is also connected to the outlets of colter pressure adjustment cylinders 104, 108 so that the hydraulic fluid discharged from colter pressure adjustment cylinders 104, 108 is again fed back to hydraulic tank 204 of hydraulic unit 200.

Housing 52 of hydraulic control block 50 can be made of, for example, plastic material and/or metal. Housing 52 can be, for example, a plastic injection molded or aluminum injection molded housing.

Hydraulic circuit 10 integrated into housing 52 comprises an inflow line 12 connected to inlet connection 54. Via inflow line 12 and throttle 14, the hydraulic fluid reaches a line region 16 which is connected to colter pressure adjustment cylinder 108 and specifies a hydraulic pressure to colter pressure adjustment cylinder 108. Line region 16 is the "second line region" within the meaning of the claims.

Adjoining line region 16 is a pressure limitation valve 18 by which the hydraulic pressure in line region 16 is limited to a maximum pressure. Pressure limitation valve 18 is the "second pressure limitation valve" within the meaning of the claims.

Line region 16 therefore abuts against valve inlet 24 of pressure limitation valve 18. Abutting against valve outlet 26 of pressure limitation valve 18 is a line region 20 which is connected to colter pressure adjustment cylinder 104 and specifies a hydraulic pressure to colter pressure cylinder 104. The hydraulic pressure in line region 20 is limited by a pressure limitation valve 22 to a maximum pressure. Line region 20 is the "first line region" within the meaning of the claims. Pressure limitation valve 22 is the "first pressure limitation valve" within the meaning of the claims.

The maximum pressure to which pressure limitation valve 18 limits the hydraulic pressure in line region 16 is dependent upon the hydraulic pressure in line region 20. Pressure limitation valve 18 opens when an opening pressure that prevails at valve inlet 24 is exceeded, where the opening pressure is dependent upon a spring closing force and an additional closing force. The spring closing force is exerted by a valve spring of pressure limitation valve 18. The additional closing force is exerted by the hydraulic pressure in line region 20. Pressure limitation valve 18 is there configured such that the spring closing force and the additional closing force add up to a total closing force and thus lead to an increased opening pressure. Due to pressure limitation valves 22, 18 being connected in series, two different hydraulic pressures can be provided with comparatively low complexity and can be used to implement two colter pressures differing from one another. In this way, a higher colter pressure can be set at the sowing colter which is connected to colter pressure adjustment cylinder 108 and which runs in the compacted tractor lane, than at the sowing colter which is connected to colter pressure adjustment cylinder 104. Due to a comparatively simple design with a small number of inexpensive standard components, colter pressure adjustment cylinders 104, 108 can be subjected to different hydraulic pressures so that soil compaction in the region of the travel lane of the tractor is compensated for by the colter pressure difference.

The hydraulic pressure in line region 16 is therefore increased by a fixed amount which is dependent upon the spring closing force of the valve spring of pressure limitation valve 18. The spring closing force is preset at the factory and can be subsequently changed by the machine operator. For this purpose, pressure limitation valve 18 can be adjusted manually. The fluid pressure required to overcome the spring closing force can be adjusted by adjusting pressure limitation valve 18. For this purpose, pressure limitation valve 18 is connected to an operating device by way of which the pressure limitation valve can be adjusted. The operating device can be, for example, a hand wheel or an adjustment slide.

Pressure limitation valve 22 is an electrically adjustable valve. Pressure limitation valve 22 is configured as a proportional pressure limitation valve in which opening pressures can be adjusted in proportion to the solenoid current.

Hydraulic circuit 10 furthermore comprises an outflow line 28 which is connected to return connection 60. The hydraulic fluid passing through pressure limitation valve 22 can be discharged via outflow line 28 from hydraulic control block 50.

Furthermore, hydraulic circuit 10 comprises two pressure gauges 30a, 30b via which the fluid pressures in line regions 16, 20 can be monitored.

In an embodiment not shown, pressure gauge 30b is replaced by a pressure sensor, where the signals from this pressure sensor make enable controlling the hydraulic pressure in line region 20, i.e. the "first line region". In particular, the signals from the pressure sensor are used to control pressure limitation valve 22, i.e. the "first pressure limitation valve", based on a comparison between an actual hydraulic pressure measured by the pressure sensor and a target hydraulic pressure that can be specified by a user.

LIST OF REFERENCE CHARACTERS 10 hydraulic circuit
12 inflow line
14 throttle
16 line region
18 pressure limitation valve
20 line region
22 pressure limitation valve
24 valve inlet
26 valve outlet
28 outflow line
30a, 30b pressure gauge
50 hydraulic control block
52 housing
54 inlet connection
56 cylinder connection
58 cylinder connection
60 return connection
100 inlet line
102 connecting line
104 colter pressure adjustment cylinder
106 connecting line
108 colter pressure adjustment cylinder
110 return line 200 hydraulic unit
202 hydraulic source
204 hydraulic tank

The invention claimed is:

1. A hydraulic circuit for colter pressure adjustment at an agricultural spreading machine, comprising:
   a first line region configured to be connected to a first colter pressure adjustment cylinder and to specify a hydraulic pressure to said first colter pressure adjustment cylinder;
   a first pressure limitation valve configured to limit the hydraulic pressure in said first line region to a first maximum pressure;
   a second line region configured to be connected to a second colter pressure adjustment cylinder and to specify a hydraulic pressure to said second colter pressure adjustment cylinder; and
   a second pressure limitation valve configured to limit the hydraulic pressure in said second line region to a second maximum pressure;
   wherein the second maximum pressure to which said second pressure limitation valve limits the hydraulic pressure in said second line region is dependent upon the hydraulic pressure in said first line region, and wherein said second line region abuts against a valve inlet of said second pressure limitation valve, and said first line region abuts against a valve outlet of said second pressure limitation valve.

2. The hydraulic circuit according to claim 1,
   wherein said second pressure limitation valve is configured to open when an opening pressure that prevails at said valve inlet is exceeded, wherein the opening pressure depends upon:
   a spring closing force which is exerted by a valve spring of said second pressure limitation valve, and
   an additional closing force which is exerted by the hydraulic pressure in said first line region.

3. The hydraulic circuit according to claim 2, wherein said second pressure limitation valve is configured such that the spring closing force and the additional closing force add up to a total closing force and thus lead to an increased opening pressure.

4. The hydraulic circuit according to claim 1, wherein said first pressure limitation valve and said second pressure limitation valve are connected in series.

5. The hydraulic circuit according to claim 1, wherein said second pressure limitation valve can be adjusted mechanically and/or manually.

6. The hydraulic circuit according claim 1, wherein said first pressure limitation valve can be adjusted electrically.

7. A hydraulic control block comprising:
   a housing and
   a hydraulic circuit integrated into said housing;
   wherein said hydraulic circuit is configured according to claim 1.

8. An agricultural spreading machine, comprising:
   a first colter pressure adjustment cylinder configured to adjust a colter pressure of at least one colter;
   a second colter pressure adjustment cylinder configured to adjust a colter pressure of at least one second colter; and
   a hydraulic circuit which is connected to said first colter pressure adjustment cylinder and to said second colter pressure adjustment cylinder and is configured to provide hydraulic pressure to said first colter pressure adjustment cylinder and to said second colter pressure adjustment cylinder;
   wherein said hydraulic circuit is part of the hydraulic control block of claim 7.

9. An agricultural spreading machine, comprising:
   a first colter pressure adjustment cylinder configured to adjust a colter pressure of at least one colter;
   a second colter pressure adjustment cylinder configured to adjust a colter pressure of at least one second colter; and
   a hydraulic circuit which is connected to said first colter pressure adjustment cylinder and to said second colter pressure adjustment cylinder and is configured to provide hydraulic pressure to said first colter pressure adjustment cylinder and to said second colter pressure adjustment cylinder;
   wherein said hydraulic circuit is configured according to claim 1.

10. A method for adjusting the colter pressure at an agricultural spreading machine according to claim 9, by way of the hydraulic circuit, comprising:
    limiting the hydraulic pressure in a first line region of said hydraulic circuit to a first maximum pressure by way of a first pressure limitation valve of said hydraulic circuit, wherein said first line region is connected to the first colter pressure adjustment cylinder and specifies a hydraulic pressure to said first colter pressure adjustment cylinder;
    limiting the hydraulic pressure in a second line region of said hydraulic circuit to a second maximum pressure by way of a second pressure limitation valve of said hydraulic circuit, wherein said second line region is connected to the second colter pressure adjustment cylinder and specifies a hydraulic pressure to said second colter pressure adjustment cylinder;
    wherein the second maximum pressure to which said second pressure limitation valve limits the hydraulic pressure in said second line region is dependent upon the hydraulic pressure in said first line region.

* * * * *